(12) United States Patent
Yu et al.

(10) Patent No.: US 11,514,815 B1
(45) Date of Patent: Nov. 29, 2022

(54) SYSTEM, METHOD, AND DEVICE FOR GENERATING FLIGHT TRAINING SCHEME ORIENTED TO INDIVIDUAL DIFFERENCE

(71) Applicant: Zhuhai Xiangyi Aviation Technology Company LTD., Zhuhai (CN)

(72) Inventors: Hai Yu, Zhuhai (CN); Jin Jiang, Zhuhai (CN)

(73) Assignee: Zhuhai Xiangyi Aviation Technology Company LTD., Zhuhai (CN)

( * ) Notice: Subject to any disclaimer, the term of this patent is extended or adjusted under 35 U.S.C. 154(b) by 0 days.

(21) Appl. No.: 17/844,013

(22) Filed: Jun. 19, 2022

(30) Foreign Application Priority Data

May 19, 2022 (CN) .......................... 202210540847.3

(51) Int. Cl.
*G09B 19/16* (2006.01)
*G09B 9/16* (2006.01)
(52) U.S. Cl.
CPC .............. *G09B 19/165* (2013.01); *G09B 9/16* (2013.01)
(58) Field of Classification Search
CPC ............................... G09B 19/16; G09B 19/165
See application file for complete search history.

(56) References Cited

U.S. PATENT DOCUMENTS

| | | | | |
|---|---|---|---|---|
| 2005/0221268 | A1* | 10/2005 | Chaar | G09B 7/02 434/350 |
| 2015/0050623 | A1* | 2/2015 | Falash | G09B 9/24 434/362 |
| 2015/0099255 | A1* | 4/2015 | Aslan | H04L 67/535 434/350 |
| 2015/0348431 | A1* | 12/2015 | Straker | G06Q 50/01 434/309 |

* cited by examiner

*Primary Examiner* — Timothy A Musselman
(74) *Attorney, Agent, or Firm* — Bayramoglu Law Offices LLC

(57) ABSTRACT

A system, method, and device for generating a flight training scheme oriented to an individual difference are provided to resolve a problem that a differentiated training scheme applicable to a training state of a trainee cannot be generated quickly. The system includes a first apparatus configured to obtain identity information of a user; a second apparatus configured to store training data of the user; a third apparatus configured to read the corresponding training data of the user based on the identity information of the user, obtain a mastery degree of a training item of the user as well as an emotion class and rating of the user corresponding to the training item, configure the training item based on a training scenario, and generate an initial training scheme; and a fourth apparatus configured to configure a flight training simulation environment based on the initial training scheme.

9 Claims, 2 Drawing Sheets

SYSTEM, METHOD, AND DEVICE FOR GENERATING FLIGHT TRAINING SCHEME ORIENTED TO INDIVIDUAL DIFFERENCE

CROSS REFERENCE TO THE RELATED APPLICATIONS

This application is based upon and claims priority to Chinese Patent Application No. 202210540847.3, filed on May 19, 2022, the entire contents of which are incorporated herein by reference.

TECHNICAL FIELD

The present disclosure relates to the field of computers, and specifically, to a system, method, and device for generating a flight training scheme oriented to an individual difference.

BACKGROUND

A flight ability is a comprehensive ability of successfully completing a flight task, including physical fitness, operation control, and psychological and emotional control. At present, more advanced devices and methods have been applied to flight ability training, but the flight training schemes are mostly customized by trainers based on trainees' learning states and training content arrangement. While this method can be personalized for a single trainee, there is a high requirement for a scheme provider, and there are great differences due to different trainers.

There are also some computer-based training scheme generation systems. Based on a computer system, training items and training scenarios are manually selected, and a training scheme is generated by a computer, or a training scheme is matched from a training scheme library based on a learning progress and a mastery degree of a trainee.

Among the existing methods, there are still some deficiencies in generation of a differentiated training scheme, a generation speed of the training scheme, applicability of the training scheme to the trainee, online update of the training scheme, and the like.

SUMMARY

To resolve the above problem in the prior art, in other words, to resolve a problem that a differentiated training scheme applicable to a training state of a trainee cannot be generated quickly, the present disclosure provides a system for generating a flight training scheme oriented to an individual difference, including a first apparatus, a second apparatus, a third apparatus, and a fourth apparatus, where the first apparatus is configured to obtain identity information of a user;

the second apparatus is configured to store training data of the user;

the third apparatus is configured to read the corresponding training data of the user based on the identity information of the user, obtain a mastery degree of a training item of the user as well as an emotion class and rating that are of the user and correspond to the training item, configure the training item based on a training scenario, and generate an initial training scheme; and the fourth apparatus is configured to configure a flight training simulation environment based on the initial training scheme, where in a training process, the fourth apparatus collects physiological data and training item operation data of the user in real time, obtains a mastery degree of a current training item of the user as well as an emotion class and rating that are of the user and correspond to the current training item, generates a timing sequence configuration of a subsequent training item, and updates the training scheme.

The initial training scheme is obtained by a preset training efficiency optimization method based on duration and environmental constraints of the training scenario, the mastery degree of the training item, and the emotion class and rating that are of the user and correspond to the training item.

The training efficiency optimization method includes:

obtaining a training item combination with greatest training efficiency by a preset training efficiency calculation method and a Markov Monte Carlo method based on a training item set.

A second aspect of the present disclosure provides a method for generating a flight training scheme oriented to an individual difference, including:

obtaining identity information of a user;

reading corresponding training data of the user based on the identity information of the user, obtaining a mastery degree of a training item of the user as well as an emotion class and rating that are of the user and correspond to the training item, configuring a training item based on a training scenario, and generating an initial training scheme; and configuring a flight training simulation environment based on the initial training scheme, where in a training process, physiological data and training item operation data of the user are collected in real time, the mastery degree of the current training item of the user as well as the emotion class and rating that are of the user and correspond to the current training item are obtained, a timing sequence configuration of a subsequent training item is generated, and the training scheme is updated.

A third aspect of the present disclosure provides a device, including:

at least one processor; and a memory communicatively connected to the at least one processor, where the memory stores an instruction executable by the processor, and the instruction is configured to be executed by the processor to implement the above method for generating a flight training scheme oriented to an individual difference.

A fourth aspect of the present disclosure provides a computer-readable storage medium. The computer-readable storage medium stores a computer instruction, and the computer instruction is configured to be executed by a computer to implement the above method for generating a flight training scheme oriented to an individual difference.

The present disclosure has the following beneficial effects:

(1) By a computer, the present disclosure obtains historical training data of a user, extracts a mastery degree of a training item of the user as well as an emotion class and rating that are of the user and correspond to the training item, configures a training item based on a training scenario, and generates an initial training scheme, such that each user can quickly and effectively obtain a differentiated training scheme, and applicability of the training scheme to a trainee is improved.

(2) In a training process, based on a mastery degree of a current training item of the user and an emotion class and rating that are of the user and correspond to the current training item, a timing sequence configuration of a subsequent training item is generated, and the training scheme is updated. In this way, a training state of the user can be monitored at any time, and the subsequent training item is adjusted for a purpose of maximizing training efficiency, so as to further enhance applicability of the training scheme to the trainee, and greatly improve training efficiency.

(3) The training efficiency calculation method fully considers training duration, the mastery degree of the training item, and the emotion class and rating that are of the user and correspond to the training item, such that the training efficiency better matches an ability of the user in mastering the corresponding training item.

(4) In a process of generating an optimal training item combination, the Markov Monte Carlo method is used, which greatly reduces optimization time, improves the generation efficiency of the training scheme, and also realizes online update of the training scheme.

BRIEF DESCRIPTION OF THE DRAWINGS

Other features, objectives and advantages of the present disclosure will become more apparent upon reading the detailed description of the non-restrictive embodiments with reference to the following accompanying drawings.

DETAILED DESCRIPTION OF THE EMBODIMENTS

A system for generating a flight training scheme oriented to an individual difference according to the present disclosure includes a first apparatus, a second apparatus, a third apparatus, and a fourth apparatus.

The first apparatus is configured to obtain identity information of a user.

The second apparatus is configured to store training data of the user.

The third apparatus is configured to read the corresponding training data of the user based on the identity information of the user, obtain a mastery degree of a training item of the user as well as an emotion class and rating that are of the user and correspond to the training item, configure the training item based on a training scenario, and generate an initial training scheme.

The fourth apparatus is configured to configure a flight training simulation environment based on the initial training scheme.

In a training process, the fourth apparatus collects physiological data and training item operation data of the user in real time, obtains a mastery degree of a current training item of the user as well as an emotion class and rating that are of the user and correspond to the current training item, generates a timing sequence configuration of a subsequent training item, and updates the training scheme.

Figure 1:
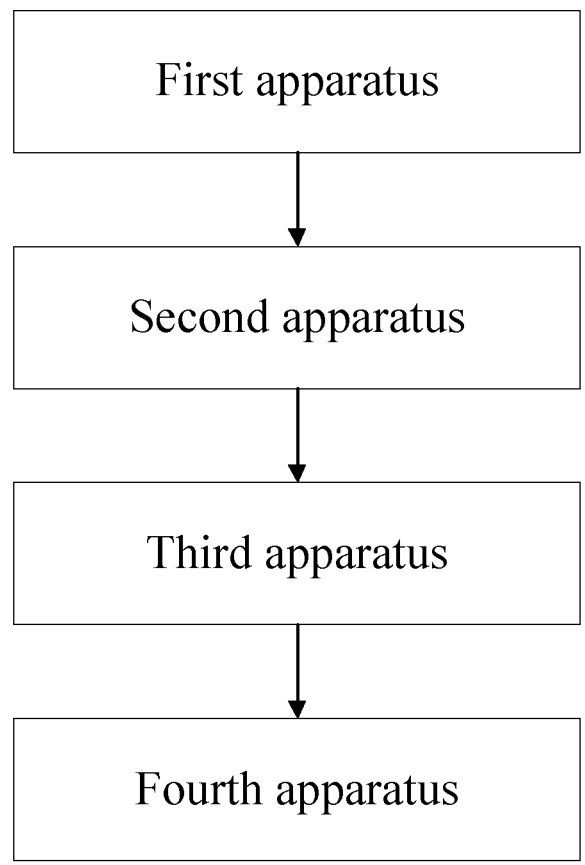
FIG. 1 is a schematic frame diagram of a system for generating a flight training scheme oriented to an individual difference according to the present disclosure.
Figure 2:
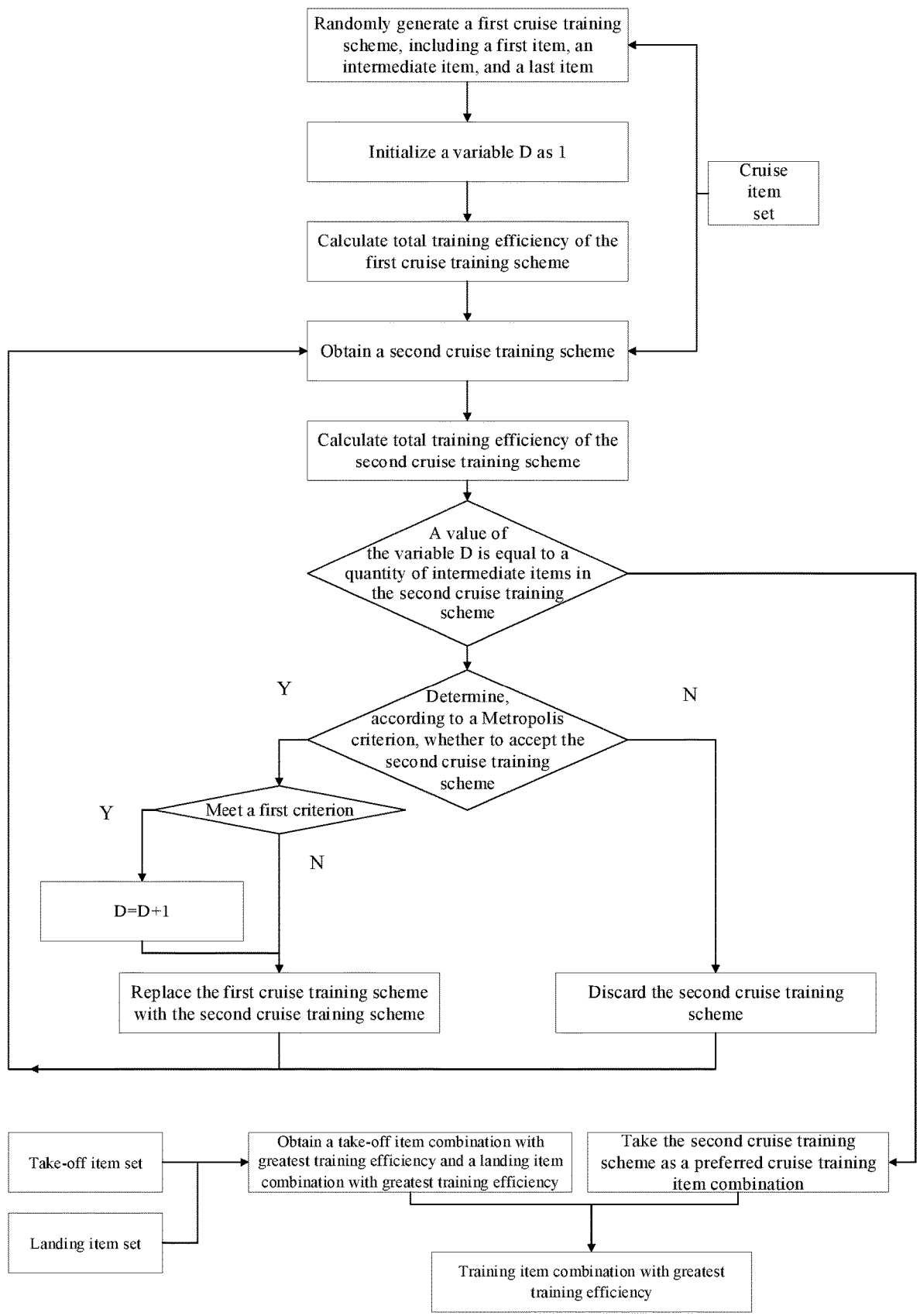
FIG. 2 is a schematic flowchart of a method for obtaining a training item combination with greatest training efficiency according to an embodiment of the present disclosure.

To more clearly describe the system for generating a flight training scheme oriented to an individual difference according to the present disclosure, the embodiments of the present disclosure are described in detail below with reference to the FIG. 1 and FIG. 2.

A system for generating a flight training scheme oriented to an individual difference according to a first embodiment of the present disclosure includes a first apparatus, a second apparatus, a third apparatus, and a fourth apparatus, which are described in detail below.

1. First Apparatus

The first apparatus may be a mobile terminal such as a mobile phone, may be a computer, or the like. The first apparatus is configured to identify a user, and obtain identity information and permissions of the user based on obtained identification information (such as an account, a password, face identification, fingerprint identification, and pupil identification) of the user.

2. Second Apparatus

As a user training database, the second apparatus is configured to store historical training data of the user. The training data includes training time, a training scheme, a training item, training item operation data, and physiological data (including a respiratory frequency, a pulse, blood pressure, and the like) that is of the user and corresponds to the training item in each training, and can further include a mastery degree of the training item as well as an emotion class and rating that are of the user and correspond to the training item.

In order to obtain a more accurate emotion class, this embodiment further adds facial expression data of the user in the training process to the physiological data of the user.

3. Third Apparatus

The third apparatus is a data processing apparatus. A server with a strong remote computing capability can be selected as the third apparatus to generate a training scheme with a complex training environment and long training duration. An intelligent unit of a training machine or an intelligent mobile terminal can be selected as the third apparatus to generate a training scheme with a simple training environment and short training duration.

The third apparatus in this embodiment is configured to read corresponding training data of the user based on the identity information of the user, obtain a mastery degree of a training item of the user as well as an emotion class and rating that are of the user and correspond to the training item, configure the training item based on a training scenario, and generate an initial training scheme.

The generation of the initial training scheme is subject to constraints of the training scenario. The constraints include training duration, an environmental constraint, and the like. For example, when a training scenario of a flight from city 1 to city 2 is simulated, total duration of training items that can be added cannot exceed total flight duration. In order to achieve authenticity of the training, a training item that can be added to a training scheme needs to be selected based on a local environmental factor. This part of content has been applied maturely in a simulator, and is not detailed herein.

Training items that can be selected based on the training scenario constitute a training item set based on a preset quantity of times that each item is to be selected. The preset quantity of times that each item is to be selected is set based on experience. For example, a pressure test training item is allowed to occur only once in the training scheme, and an instrument fault can occur at most 3 times in the training scheme.

After the training item set is obtained, the initial training scheme can be obtained by a preset training efficiency optimization method based on the mastery degree of the training item, and the emotion class and rating that are of the user and correspond to the training item. In this embodiment, the training efficiency optimization method includes: obtaining a training item combination with greatest training efficiency by a preset training efficiency calculation method and a Markov Monte Carlo method.

Before the training efficiency calculation method is described, basic information contained in the training item set needs to be determined, including an item name, the mastery degree of the training item, the emotion class and rating that are of the user and correspond to the training item, a quantity of initial joining times of the training item, a quantity of training completion times, last training completion time, and a correlated item and a corresponding correlation degree.

The training efficiency calculation method includes:

$$E_{T0} = E_{ax} + E_{p1} + E_{p2} + \ldots + E_{pn} + E_{by}$$

$$t_{ax} + t_{p1} + t_{p2} + \ldots + t_{pn} + t_{by} \leq t_{T0}$$

$$E_{pn} = E_{pn(0)} \frac{E_{pn(0)}}{m_{pn} \sum_{i=0} S_{pn(i)} E_{pn(i)}}$$

$$E_{pn(0)} = (1 - Z_{pn}) L_{pn} Q_{pn} Y_{pn}$$

$$E_{ax} = E_{ax(0)} \frac{E_{ax(0)}}{m_{ax} \sum_{i=0} S_{ax(i)} E_{ax(i)}}$$

$$E_{ax(0)} = (1 - Z_{ax}) L_{ax} Q_{ax} Y_{ax}$$

$$E_{by} = E_{by(0)} \frac{E_{by(0)}}{m_{by} \sum_{i=0} S_{by(i)} E_{by(i)}}$$

$$E_{by(0)} = (1 - Z_{by}) L_{by} Q_{by} Y_{by}$$

where $E_{T0}$ and $t_{T0}$ represent total training efficiency and total training duration, respectively; $E_{ax}$, $E_{ax(0)}$, $E_{ax(i)}$, $S_{ax(i)}$, $m_{ax}$, $t_{ax}$, $Z_{ax}$, $L_{ax}$, $Q_{ax}$, and $Y_{ax}$ represent training efficiency, original efficiency, original efficiency of an $i^{th}$ correlated item, a correlation degree with the $i^{th}$ correlated item, a total quantity of correlated items, training duration, a mastery degree, an emotion class value in a last training, an emotion rating value in the last training, and a forgetting index in an $x^{th}$ training item of a take-off item, respectively; $E_{by}$, $E_{by(0)}$, $E_{by(i)}$, $S_{by(i)}$, $m_{by}$, $t_{by}$, $Z_{by}$, $L_{by}$, $Q_{by}$, and $Y_{by}$ represent training efficiency, original efficiency, original efficiency of an $i^{th}$ correlated item, a correlation degree with the $i^{th}$ correlated item, a total quantity of correlated items, training duration, a mastery degree, an emotion class value in a last training, an emotion rating value in the last training, and a forgetting index in a $y^{th}$ training item of a landing item, respectively; and $E_{pn}$, $E_{pn(0)}$, $E_{pn(i)}$, $Z_{pn(i)}$, $m_{pn}$, $t_{pn}$, $Z_{pn}$, $L_{pn}$, $Q_{pn}$, and represent training efficiency, original efficiency, original efficiency of an $i^{th}$ correlated item, a correlation degree with the $i^{th}$ correlated item, a total quantity of correlated items, training duration, a mastery degree, an emotion class value in a last training, an emotion rating value in the last training, and a forgetting index in an $n^{th}$ selected training item of a cruise item, respectively.

In this embodiment, the mastery degree is a percentage, for example, the mastery degree is 70%. The emotion class is, for example, a fear emotion, a nervous emotion, and a normal emotion. The emotion class value is expressed by data, for example, is 0.9 for the fear emotion, 0.6 for the nervous emotion, and 0.3 for the normal emotion. There are four emotion ratings with emotion class values being 0.3, 0.5, 0.7 and 0.9 from weak to strong, respectively. If the emotion class is the normal emotion, the emotion rating value is 0.1. $(1-Z_{pn})$, $(1-Z_{ax})$, and $(1-Z_{by})$ respectively represent indexes indicating that corresponding training items are to be trained. The correlated item and the corresponding correlation degree are preset. For example, for an instrument fault item in a cruise phase, its correlated items may be set as an instrument fault in a take-off phase and an instrument fault in a landing phase, and corresponding correlation degrees are 0.8 and 0.7, respectively.

The forgetting index is obtained by a forgetting curve based on the quantity of training completion times and the last training completion time. A method for calculating the forgetting index Y is as follows:

$$Y = \begin{cases} 1 & W = 0 \\ G/1 & W = 1 \\ G/2 & W = 2 \\ G/4 & W = 3 \\ G/7 & W = 4 \\ G/15 & W = 5 \\ G/30 & W \geq 6 \end{cases}$$

where G represents a quantity of days between current time and the last training completion time, which is counted in hours, where the part less than one day is expressed in a decimal form by a duration proportion, for example, 36 hours is expressed as 1.5 days; and W represents a quantity of times that the corresponding training item has been completed.

The training item set includes a take-off item set, a cruise item set, and a landing item set. The training item combination with the greatest training efficiency includes the take-off item, the cruise item combination, and the landing item, and can be obtained by using the Markov Monte Carlo method and the above training efficiency calculation method. As shown in FIG. 2, specific steps are as follows:

S1: Randomly generate a first cruise training scheme based on the cruise item set; and initialize a variable D as 1.

S2: Calculate total training efficiency $E_p^1$ of the first cruise training scheme.

$$E_p = E_{p1} + E_{p2} + \ldots + E_{pn}$$

S3: Retain D items of intermediate items in the first cruise training scheme, and replace the rest items with items randomly selected from the cruise item set to obtain a second cruise training scheme.

S4: Calculate total training efficiency $E_p^1$ of the second cruise training scheme, where $$E_p^1 = E_{p1}^1 + E_{p2}^1 + \ldots + E_{pn}^1$$

$E_{pn}^1$ represents training efficiency of an $n^{th}$ selected training item in the second cruise training scheme.

S5: Accept or reject the second cruise training scheme according to a Metropolis criterion, stop iteration when a value of the variable D is equal to a quantity of intermediate items in the second cruise training scheme, and take the second cruise training scheme as a preferred cruise item combination.

S6: Obtain a take-off item combination with greatest training efficiency from the take-off item set and a landing item combination with greatest training efficiency from the landing item set, to form the training item combination with the greatest training efficiency together with the preferred cruise item combination.

In step S5, the accepting or rejecting the second cruise training scheme includes:

when accepting the second cruise training scheme, if a decrease ratio of the total training efficiency of the second cruise training scheme compared with the total training efficiency of the first cruise training scheme is less than $K_D$ for consecutive $H_D$ times, determining that D=D+1, and replacing the first cruise training scheme with the second cruise training scheme, and performing S3; otherwise, replacing the first cruise training scheme with the second cruise training scheme, and performing S3; or when rejecting the second cruise training scheme, discarding the second cruise training scheme and performing S3.

$H_D$ represents a preset quantity of times under a corresponding value of the variable D, and $K_D$ represents a preset threshold under the corresponding value of the variable D.

After the training item combination with the greatest training efficiency is obtained, the initial training scheme is obtained by performing the following steps:

(1) Extract a training item sequence of the training item combination with the greatest training efficiency. The training item sequence may be arranged randomly. If there are training items that have a sequential correlation relationship, the correlated training items are randomly arranged as a random arrangement unit, and correlated training item units are arranged in sequence based on a forward-backward correlation relationship.

(2) Obtain training item intensity of a training item in the training item combination with the greatest training efficiency based on a preset mapping relationship between an emotion class and rating and training item intensity. An example of the mapping relationship between the emotion class and rating and the training item intensity is shown in Table 1.

TABLE 1

|  | First rating | Second rating | Third rating | Fourth rating |
|---|---|---|---|---|
| Fear | 4 | 3 | 2 | 1 |
| Nervous | 8 | 7 | 6 | 5 |
| Normal |  | 10 |  |  |

The training item intensity is a proportion of a simulation reality of the training item. For example, a pressure index of a pressure loss environment training is simulated as a percentage based on an intensity value. Level 1 corresponds to 10% of a normal pressure loss parameter, level 8 corresponds to 80% of the normal pressure loss parameter, and level 10 corresponds to 100% of the normal pressure loss parameter. For another example, in a dive training, level 1 corresponds to 10% of a maximum dive angle and 10% of a velocity, level 8 corresponds to 80% of the maximum dive angle and 80% of the velocity, and level 10 corresponds to 100% of the maximum dive angle and 100% of the velocity.

(3) Generate the initial training scheme based on the training item sequence and the training item intensity.

4. Fourth Apparatus

The fourth apparatus is a flight simulator, and the flight simulator configures a flight training simulation environment based on the initial training scheme, the training item sequence, and the training item intensity, to wait for the user to perform training.

In the training process, the training scheme is also updated. The training scheme may be updated by the third apparatus and sent back to the fourth apparatus, or directly updated by the fourth apparatus. The fourth apparatus configures a flight training simulation environment for a subsequent to-be-completed training item based on an updated training scheme.

A method for updating the training scheme includes:

deducting, from the training item set, a quantity of times that a completed training item can be selected;

adding a corresponding training item to the training item set by a preset training addition determining method based on a mastery degree of a last completed training item and an emotion class and rating that are of the user and correspond to the last completed training item;

based on an updated training item set, taking a current training scheme as the first cruise training scheme, taking an uncompleted intermediate item as an optimization object, and updating the cruise item combination by performing S2 to S5 in the method for obtaining the training item combination with the greatest training efficiency; and updating the training scheme based on an updated cruise item combination.

The preset training addition determining method includes:

determining that an emotion class and rating that are of the user and correspond to the completed training item are within a preset range of an adding-allowed training, where the preset range of the adding-allowed training includes the first and second ratings of the fear emotion and the first to the third ratings of the nervous emotion; and taking a maximum quantity of times that a training item is allowed in a single training as a first constraint, and obtaining a quantity of times of added trainings based on a first mapping relationship, where the first mapping relationship is a preset mapping relationship between the mastery degree of the training item, an increase range of the mastery degree of the training item, and the quantity of times of added trainings, as shown in Table 2.

TABLE 2

|  | First rating of the fear emotion | Second rating of the fear emotion | First rating of the nervous emotion | Second rating of the nervous emotion | Third rating of the nervous emotion |
|---|---|---|---|---|---|
| Quantity of times of added trainings | 2 | 1 | 1 | 2 | 1 |

A method for generating a flight training scheme oriented to an individual difference according to a second embodiment of the present disclosure includes:

obtaining identity information of a user;

reading corresponding training data of the user based on the identity information of the user, obtaining a mastery degree of a training item of the user as well as an emotion class and rating that are of the user and correspond to the training item, configuring the training item based on a training scenario, and generating an initial training scheme; and configuring a flight training simulation environment based on the initial training scheme, where in a training process, physiological data and training item operation data of the user are collected in real time, a mastery degree of a current training item of the user as well as an emotion class and rating that are of the user and correspond to the current training item are obtained, a timing sequence configuration of a subsequent training item is generated, and the training scheme is updated.

Those skilled in the art can clearly understand that, for convenience and brevity of description, reference may be made to corresponding processes in the above system embodiments for specific working processes and related description of the method, and details are not described herein again.

It should be noted that the generation of a flight training scheme oriented to an individual difference in the above embodiments is illustrated only based on division of the above functional modules. In practical application, the foregoing functions may be completed by different functional modules according to needs. That is, the modules or steps in the embodiments of the present disclosure can be decomposed or combined again, for example, the modules of the above embodiments can be combined into one module or further divided into a plurality of sub-modules to complete all or part of the functions described above. The names of the modules and steps involved in the embodiments of the present disclosure are only for distinguishing each module or step, and should not be regarded as improper limitations on the present disclosure.

A device according to a third embodiment of the present disclosure includes:

at least one processor; and a memory communicatively connected to the at least one processor, where the memory stores an instruction executable by the processor, and the instruction is configured to be executed by the processor to implement the above method for generating a flight training scheme oriented to an individual difference.

A computer-readable storage medium according to a fourth embodiment of the present disclosure stores a computer instruction, and the computer instruction is configured to be executed by a computer to implement the above method for generating a flight training scheme oriented to an individual difference.

Those skilled in the art can clearly understand that, for convenience and brevity of description, reference may be made to corresponding processes in the above method embodiments for specific working processes and related description of the storage apparatus and processing apparatus, and details are not described herein again.

Particularly, according to the embodiments of the present disclosure, the process described above with reference to the flowchart may be implemented as a computer software program. For example, an embodiment of the present disclosure includes a computer program product including a computer program carried by a computer-readable medium. The computer program includes program code for executing the method shown in the flowchart. In this embodiment, the computer program may be downloaded from a network by means of the communication part and installed, and/or be installed from the removable medium. When the computer program is executed by the CPU, the functions defined in the method of the present disclosure are executed. It should be noted that, the computer-readable medium in the present disclosure may be a computer-readable signal medium, a computer-readable storage medium, or a combination thereof. The computer-readable storage medium, may be, for example, but not limited to, electrical, magnetic, optical, electromagnetic, infrared, or semiconductor systems, apparatuses, or devices, or any combination thereof. More specific examples of the computer-readable storage medium may include, but are not limited to: an electric connector with one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any proper combination thereof. In the present disclosure, the computer-readable storage medium may be any tangible medium including or storing a program, and the program may be used by or used in combination with an instruction execution system, apparatus or device. In the present disclosure, the computer-readable signal medium may include a data signal propagated in a baseband or propagated as a part of a carrier, and carries computer-readable program code. The propagated data signal may be in various forms, including but not limited to an electromagnetic signal, an optical signal, or any suitable combination thereof. The computer-readable signal medium may alternatively be any computer-readable medium except the computer-readable storage medium. The computer-readable medium may send, propagate or transmit a program used by or used in combination with an instruction execution system, apparatus or device. The program code contained on the computer-readable medium may be transmitted using any suitable medium, including but not limited to: wireless, wire, optical fiber, RF, or any suitable combination thereof.

The computer program code for executing the operations in the present disclosure may be compiled by one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. When a remote computer is involved, the remote computer may be connected to the user computer via any type of network including a LAN or a wide area network (WAN), or may be connected to an external computer (for example, connected via the Internet by an Internet service provider).

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that, in some alternative implementations, the functions marked in the blocks may alternatively be performed in an order different from that marked in the drawings. For example, two successively shown blocks actually may be executed in parallel substantially, or may be executed in reverse order sometimes, depending on the functions involved. It should also be noted that each block in the block diagrams and/or flowcharts and combinations of the blocks in the block diagrams and/or flowcharts may be implemented by a dedicated hardware-based system for executing specified functions or operations, or may be implemented by a combination of dedicated hardware and computer instructions.

Terms such as "first" and "second" are intended to distinguish between similar objects, rather than describe or indicate a specific order or sequence.

Terms "include", "comprise" or any other variations thereof are intended to cover non-exclusive inclusions, such that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure are described with reference to the preferred implementations shown in the accompanying drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions after these changes or substitutions should fall within the protection scope of the present disclosure.

What is claimed is:

1. A system for generating a flight training scheme oriented to an individual difference, comprising a first apparatus, a second apparatus, a third apparatus, and a fourth apparatus, wherein
   the first apparatus is configured to obtain identity information of a user;
   the second apparatus is configured to store training data of the user;
   the third apparatus is configured to read the training data of the user based on the identity information of the user, the third apparatus is configured to obtain a mastery degree of a training item of the user as well as an emotion class and rating of the user, wherein the emotion class and rating correspond to the training item, the third apparatus is configured to configure the training item based on a training scenario, and the third apparatus is configured to generate an initial training scheme; and
   the fourth apparatus is configured to configure a flight training simulation environment based on the initial training scheme, wherein
   in a training process, the fourth apparatus collects physiological data of the user and training item operation data of the user in real time, the fourth apparatus obtains a mastery degree of a current training item of the user as well as an emotion class and rating of the user, wherein the emotion class and rating correspond to the current training item, the fourth apparatus generates a timing sequence configuration of a subsequent training item, and the fourth apparatus updates a training scheme;
   wherein a method for generating the initial training scheme comprises:
   obtaining the initial training scheme by a preset training efficiency optimization method based on a duration of the training scenario and environmental constraints of the training scenario, a mastery degree of the training item, and an emotion class and rating of the user, wherein the emotion class and rating correspond to the training item;
   wherein the preset training efficiency optimization method comprises:
   obtaining a training item combination with a greatest training efficiency by a preset training efficiency calculation method and a Markov Monte Carlo method based on a training item set; and
   wherein training item information in the training item set comprises an item name, the mastery degree of the training item, the emotion class and rating of the user, wherein the emotion class and rating correspond to the training item, a quantity of initial joining times of the training item, a quantity of training completion times, a last training completion time, and a correlated item and a correlation degree corresponding to the correlated item; and
   the preset training efficiency calculation method comprises:

$$E_{T0}=E_{ax}+E_{p1}+E_{p2}+\ldots+E_{pn}+E_{by}$$

$$t_{ax}+t_{p1}+t_{p2}+\ldots+t_{pn}+t_{by} \leq t_{T0}$$

$$E_{pn} = E_{pn(0)} \frac{E_{pn(0)}}{\sum_{i=0}^{m_{pn}} S_{pn(i)}E_{pn(i)}}$$

$$E_{pn(0)} = (1-Z_{pn})L_{pn}Q_{pn}Y_{pn}$$

$$E_{ax} = E_{ax(0)} \frac{E_{ax(0)}}{\sum_{i=0}^{m_{ax}} S_{ax(i)}E_{ax(i)}}$$

$$E_{ax(0)} = (1-Z_{ax})L_{ax}Q_{ax}Y_{ax}$$

$$E_{by} = E_{by(0)} \frac{E_{by(0)}}{\sum_{i=0}^{m_{by}} S_{by(i)}E_{by(i)}}$$

$$E_{by(0)} = (1-Z_{by})L_{by}Q_{by}Y_{by}$$

wherein $E_{T0}$ and $t_{T0}$ represent a total training efficiency and a total training duration, respectively;

$E_{ax}$, $E_{ax(0)}$, $E_{ax(i)}$, $S_{ax(i)}$, $m_{ax}$, $t_{ax}$, $Z_{ax}$, $L_{ax}$, $Q_{ax}$, and $Y_{ax}$ represent a training efficiency in an $x^{th}$ training item of a take-off item, an original efficiency in the $x^{th}$ training item of the take-off item, an original efficiency of an $i^{th}$ correlated item in the $x^{th}$ training item of the take-off item, a correlation degree with the $i^{th}$ correlated item in the $x^{th}$ training item of the take-off item, a total quantity of correlated items in the $x^{th}$ training item of the take-off item, a training duration in the $x^{th}$ training item of the take-off item, a mastery degree in the $x^{th}$ training item of the take-off item, an emotion class value in a last training in the $x^{th}$ training item of the take-off item, an emotion rating value in the last training in the $x^{th}$ training item of the take-off item, and a first forgetting index in the $x^{th}$ training item of the take-off item, respectively;

$E_{by}$, $E_{by(0)}$, $E_{by(i)}$, $S_{by(i)}$, $m_{by}$, $t_{by}$, $Z_{by}$, $L_{by}$, $Q_{by}$, and $Y_{by}$ represent a training efficiency in a $y^{th}$ training item of a landing item, an original efficiency in the $y^{th}$ training item of the landing item, an original efficiency of an $i^{th}$ correlated item in the $y^{th}$ training item of the landing item, a correlation degree with the $i^{th}$ correlated item in the $y^{th}$ training item of the landing item, a total quantity of correlated items in the $y^{th}$ training item of the landing item, a training duration in the $y^{th}$ training item of the landing item, a mastery degree in the $y^{th}$ training item of the landing item, an emotion class value in a last training in the $y^{th}$ training item of the landing item, an emotion rating value in the last training in the $y^{th}$ training item of the landing item, and a second forgetting index in the $y^{th}$ training item of the landing item, respectively;

$E_{pn}$, $E_{pn(0)}$, $E_{pn(i)}$, $S_{pn(i)}$, $m_{pn}$, $t_{pn}$, $Z_{pn}$, $L_{pn}$, $Q_{pn}$, and $Y_{pn}$ represent a training efficiency in an $n^{th}$ selected training item of a cruise item, an original efficiency in the $n^{th}$ selected training item of the cruise item, an original efficiency of an $i^{th}$ correlated item in the $n^{th}$ selected training item of the cruise item, a correlation degree with the $i^{th}$ correlated item in the $n^{th}$ selected training item of the cruise item, a total quantity of correlated items in the $n^{th}$ selected training item of the cruise item, a training duration in the $n^{th}$ selected training item of the cruise item, a mastery degree in the $n^{th}$ selected training item of the cruise item, an emotion class value in a last training in the $n^{th}$ selected training item of the cruise item, an emotion rating value in the last training in the $n^{th}$ selected training item of the cruise item, and a third forgetting index in the $n^{th}$ selected training item of the cruise item, respectively; and the first forgetting index, the second forgetting index, and the third forgetting index are obtained by a forgetting curve based on the quantity of training completion times and the last training completion time.

2. The system according to claim 1, wherein a method for obtaining the initial training scheme comprises:

extracting a training item sequence of the training item combination with the greatest training efficiency;

obtaining a training item intensity of a training item in the training item combination with the greatest training efficiency based on a preset mapping relationship between an emotion class and rating and the training item intensity; and generating the initial training scheme based on the training item sequence and the training item intensity.

3. The system according to claim 2, wherein the training item set comprises a take-off item set, a cruise item set, and a landing item set; and the training item combination with the greatest training efficiency comprises the take-off item, the cruise item combination, and the landing item, and the training item combination with the greatest training efficiency is obtained by a method, wherein the method comprises:

S1: randomly generating a first cruise training scheme based on the cruise item set; and initializing a variable D as 1;

S2: calculating a total training efficiency $E_p$ of the first cruise training scheme by the following equation:

$$E_p = E_{p1} + E_{p2} + \ldots + E_{pn}$$

S3: retaining D items of intermediate items in the first cruise training scheme, and replacing rest items in the first cruise training scheme with items randomly selected from the cruise item set to obtain a second cruise training scheme;

S4: calculating a total training efficiency $E_p^1$ of the second cruise training scheme by the following equation:

$$E_p^1 = E_{p1}^1 + E_{p2}^1 + \ldots + E_{pn}^1$$

wherein $E_{pn}^1$ represents a training efficiency of an $n^{th}$ selected training item in the second cruise training scheme;

S5: accepting or rejecting the second cruise training scheme according to a Metropolis criterion, stopping iteration when a value of the variable D is equal to a quantity of intermediate items in the second cruise training scheme, and taking the second cruise training scheme as a selected cruise item combination; and S6: obtaining a take-off item combination with the greatest training efficiency from the take-off item set and a landing item combination with the greatest training efficiency from the landing item set, to form the training item combination with the greatest training efficiency together with the selected cruise item combination; wherein in step S5, the step of accepting or rejecting the second cruise training scheme comprises:

when accepting the second cruise training scheme, if a decrease ratio of the total training efficiency of the second cruise training scheme compared with the total training efficiency of the first cruise training scheme is less than $K_D$ for consecutive $H_D$ times, determining that D=D+1, and replacing the first cruise training scheme with the second cruise training scheme, and performing S3; otherwise, replacing the first cruise training scheme with the second cruise training scheme, and performing S3; or when rejecting the second cruise training scheme, discarding the second cruise training scheme and performing S3;

wherein $H_D$ represents a preset quantity of times under the value of the variable D, and $K_D$ represents a preset threshold under the value of the variable D.

4. The system according to claim 3, wherein the fourth apparatus is a flight simulator, and the flight simulator configures the flight training simulation environment based on the initial training scheme, the training item sequence, and the training item intensity.

5. The system according to claim 3, wherein in the training process, a method for updating the training scheme comprises:

deducting, from the training item set, a quantity of times, wherein a completed training item is configured to be selected the quantity of times;

adding a corresponding training item to the training item set by a preset training addition determining method based on a mastery degree of a last completed training item and an emotion class and rating of the user, wherein the emotion class and rating correspond to the last completed training item to obtain an updated training item set;

based on the updated training item set, taking a current training scheme as the first cruise training scheme, taking an uncompleted intermediate item as an optimization object, and updating the cruise item combination by performing S2 to S5 in the method for obtaining the training item combination with the greatest training efficiency to obtain an updated cruise item combination; and updating the training scheme based on the updated cruise item combination.

6. The system according to claim 5, wherein the preset training addition determining method comprises:

determining that an emotion class and rating of the user are within a preset range of an adding-allowed training, wherein the emotion class and rating correspond to the completed training item; and taking a maximum quantity of times as a constraint, wherein the training item is allowed the maximum quantity of times in a single training, and obtaining a quantity of times of added trainings based on a mapping relationship, wherein the mapping relationship is a preset mapping relationship between the mastery degree of the training item, an increase range of the mastery degree of the training item, and the quantity of times of added trainings.

7. A method for generating a flight training scheme oriented to an individual difference, comprising:

obtaining identity information of a user;

reading training data of the user based on the identity information of the user, obtaining a mastery degree of a training item of the user as well as an emotion class and rating of the user, wherein the emotion class and rating correspond to the training item, configuring the training item based on a training scenario, and generating an initial training scheme; and configuring a flight training simulation environment based on the initial training scheme, wherein in a training process, physiological data of the user and training item operation data of the user are collected in real time, a mastery degree of a current training item of the user as well as an emotion class and rating of the user, wherein the emotion class and rating correspond to the current training item are obtained, a timing sequence configuration of a subsequent training item is generated, and a training scheme is updated;

wherein a method for generating the initial training scheme comprises:

obtaining the initial training scheme by a preset training efficiency optimization method based on a duration of the training scenario and environmental constraints of the training scenario, a mastery degree of the training item, and an emotion class and rating of the user, wherein the emotion class and rating correspond to the training item;

wherein the preset training efficiency optimization method comprises:

obtaining a training item combination with a greatest training efficiency by a preset training efficiency calculation method and a Markov Monte Carlo method based on a training item set; and wherein training item information in the training item set comprises an item name, the mastery degree of the training item, the emotion class and rating of the user, wherein the emotion class and rating correspond to the training item, a quantity of initial joining times of the training item, a quantity of training completion times, a last training completion time, and a correlated item and a correlation degree corresponding to the correlated item; and the preset training efficiency calculation method comprises:

$$E_{T0} = E_{ax} + E_{p1} + E_{p2} + \ldots + E_{pn} + E_{by}$$

$$t_{ax} + t_{p1} + t_{p2} + \ldots + t_{pn} + t_{by} \leq t_{T0}$$

$$E_{pn} = E_{pn(0)} \frac{E_{pn(0)}}{\sum_{i=0}^{m_{pn}} S_{pn(i)} E_{pn(i)}}$$

$$E_{pn(0)} = (1 - Z_{pn}) L_{pn} Q_{pn} Y_{pn}$$

$$E_{ax} = E_{ax(0)} \frac{E_{ax(0)}}{\sum_{i=0}^{m_{ax}} S_{ax(i)} E_{ax(i)}}$$

$$E_{ax(0)} = (1 - Z_{ax}) L_{ax} Q_{ax} Y_{ax}$$

$$E_{by} = E_{by(0)} \frac{E_{by(0)}}{\sum_{i=0}^{m_{by}} S_{by(i)} E_{by(i)}}$$

$$E_{by(0)} = (1 - Z_{by}) L_{by} Q_{by} Y_{by}$$

wherein $E_{T0}$ and $t_{T0}$ represent a total training efficiency and a total training duration, respectively;

$E_{ax}$, $E_{ax(0)}$, $E_{ax(i)}$, $S_{ax(i)}$, $m_{ax}$, $t_{ax}$, $Z_{ax}$, $L_{ax}$, $Q_{ax}$, and $Y_{ax}$ represent a training efficiency in an $x^{th}$ training item of a take-off item, an original efficiency in the $x^{th}$ training item of the take-off item, an original efficiency of an $i^{th}$ correlated item in the $x^{th}$ training item of the take-off item, a correlation degree with the $i^{th}$ correlated item in the $x^{th}$ training item of the take-off item, a total quantity of correlated items in the $x^{th}$ training item of the take-off item, a training duration in the $x^{th}$ training item of the take-off item, a mastery degree in the $x^{th}$ training item of the take-off item, an emotion class value in a last training in the $x^{th}$ training item of the take-off item, an emotion rating value in the last training in the $x^{th}$ training item of the take-off item, and a first forgetting index in the $x^{th}$ training item of the take-off item, respectively;

$E_{by}$, $E_{by(0)}$, $E_{by(i)}$, $S_{by(i)}$, $m_{by}$, $t_{by}$, $Z_{by}$, $L_{by}$, $Q_{by}$, and $Y_{by}$ represent a training efficiency in a $y^{th}$ training item of a landing item, an original efficiency in the $y^{th}$ training item of the landing item, an original efficiency of an $i^{th}$ correlated item in the $y^{th}$ training item of the landing item, a correlation degree with the $i^{th}$ correlated item in the $y^{th}$ training item of the landing item, a total quantity of correlated items in the $y^{th}$ training item of the landing item, a training duration in the $y^{th}$ training item of the landing item, a mastery degree in the $y^{th}$ training item of the landing item, an emotion class value in a last training in the $y^{th}$ training item of the landing item, an emotion rating value in the last training in the $y^{th}$ training item of the landing item, and a second forgetting index in the $y^{th}$ training item of the landing item, respectively;

$E_{pn}$, $E_{pn(0)}$, $E_{pn(i)}$, $S_{pn(i)}$, $m_{pn}$, $t_{pn}$, $Z_{pn}$, $L_{pn}$, $Q_{pn}$, and $Y_{pn}$ represent a training efficiency in an $n^{th}$ selected training item of a cruise item, an original efficiency in the $n^{th}$ selected training item of the cruise item, an original efficiency of an $i^{th}$ correlated item in the $n^{th}$ selected training item of the cruise item, a correlation degree with the $i^{th}$ correlated item in the $n^{th}$ selected training item of the cruise item, a total quantity of correlated items in the $n^{th}$ selected training item of the cruise item, a training duration in the $n^{th}$ selected training item of the cruise item, a mastery degree in the $n^{th}$ selected training item of the cruise item, an emotion class value in a last training in the $n^{th}$ selected training item of the cruise item, an emotion rating value in the last training in the $n^{th}$ selected training item of the cruise item, and a third forgetting index in the $n^{th}$ selected training item of the cruise item, respectively; and the first forgetting index, the second forgetting index, and the third forgetting index are obtained by a forgetting curve based on the quantity of training completion times and the last training completion time.

8. A device, comprising:
at least one processor; and
a memory, wherein the memory is communicatively connected to the at least one processor, wherein
an instruction executable by the processor is stored in the memory, and the instruction is configured to be executed by the processor to implement the method according to claim 7.

9. A computer-readable storage medium, wherein a computer instruction is stored in the computer-readable storage medium, and the computer instruction is configured to be executed by a computer to implement the method according to claim 7.

* * * * *